(12) United States Patent
Pan et al.

(10) Patent No.: US 9,568,663 B2
(45) Date of Patent: Feb. 14, 2017

(54) LIGHT GUIDE PLATE AND LIGHT SOURCE MODULE

(71) Applicant: Winbond Electronics Corp., Taichung (TW)

(72) Inventors: Jui-Wen Pan, Hsinchu (TW);
Che-Wen Chiang, New Taipei (TW);
Chang-Yi Li, Yunlin County (TW);
Yung-Chih Huang, Chiayi County (TW)

(73) Assignee: Winbond Electronics Corp., Taichung (TW)

( * ) Notice: Subject to any disclaimer, the term of this patent is extended or adjusted under 35 U.S.C. 154(b) by 208 days.

(21) Appl. No.: 14/505,511

(22) Filed: Oct. 3, 2014

(65) Prior Publication Data
US 2016/0097891 A1    Apr. 7, 2016

(51) Int. Cl.
*F21V 8/00* (2006.01)

(52) U.S. Cl.
CPC .......... *G02B 6/0053* (2013.01); *G02B 6/0038* (2013.01)

(58) Field of Classification Search
CPC .............................. G02B 6/0051; G02B 6/0036
See application file for complete search history.

(56) References Cited

U.S. PATENT DOCUMENTS

| | | | |
|---|---|---|---|
| 2006/0039670 A1* | 2/2006 | Feng | G02B 6/0016 385/146 |
| 2011/0096566 A1* | 4/2011 | Tsai | G02B 6/0036 362/607 |
| 2011/0128757 A1* | 6/2011 | Wang | G02B 6/0035 362/613 |
| 2012/0287677 A1* | 11/2012 | Wheatley | G02B 6/0051 362/627 |

(Continued)

FOREIGN PATENT DOCUMENTS

| | | |
|---|---|---|
| CN | 102033357 | 4/2011 |
| CN | 102565916 | 5/2014 |

(Continued)

OTHER PUBLICATIONS

Li et al., "High-efficiency backlight module with two guiding modes," Applied Optics, Mar. 10, 2014, pp. 1503-1511.

(Continued)

*Primary Examiner* — Elmito Breval
(74) *Attorney, Agent, or Firm* — Jianq Chyun IP Office

(57) ABSTRACT

A light guide plate including a first substrate, a second substrate opposite to the first substrate, a plurality of first microstructures, a plurality of second microstructures, and a plurality of third microstructures is provided. The first substrate has a light emitting surface, a first bottom surface, and a light incidence surface. The second substrate has a top surface and a second bottom surface. The top surface is located between the first substrate and the second bottom surface. The first microstructures and the second microstruc- (Continued)

tures are disposed on the light emitting surface and the second bottom surface respectively and extend along a first direction parallel to the light incidence surface respectively. The third microstructures are connected between the first bottom surface and the top surface and extend along a second direction perpendicular to the light incidence surface respectively. A light source module is also provided.

15 Claims, 2 Drawing Sheets

(56) References Cited

U.S. PATENT DOCUMENTS

2015/0160398 A1* 6/2015 Louh .................... G02B 6/0031
362/607

FOREIGN PATENT DOCUMENTS

| CN | 203673186 | 6/2014 |
|----|-----------|--------|
| TW | 201118469 | 6/2011 |
| TW | 201232126 | 8/2012 |
| TW | 201305628 | 2/2013 |
| TW | M475599   | 4/2014 |

OTHER PUBLICATIONS

"Office Action of Taiwan Counterpart Application," issued on Jun. 17, 2015, p. 1-p. 5.

\* cited by examiner

LIGHT GUIDE PLATE AND LIGHT SOURCE MODULE

BACKGROUND OF THE INVENTION

1. Field of the Invention

The present application relates to an optical element and an optical module, and particularly relates to a light guide plate and a light source module.

2. Description of Related Art

Generally speaking, light source modules may be divided into direct-type light source modules and edge-type light source module according to different positions where the light source is disposed. Taking an edge-type light source module as an example, the light source is usually disposed at a side edge of the light guide plate, which makes light beams emitted from the light source enter the light guide plate from the side edge of the light guide plate.

In the edge-type light source module, two prism sheets and two diffusers are usually disposed on a light emitting surface of the light guide plate to increase luminance as well as uniformity of light emission. However, due to factors such as materials or surface properties of the optical sheets, the optical sheets tend to absorb or scatter a part of the light beams and consequently result in loss of light quantity to a certain extent. Therefore, the optical efficiency of the light source module is unable to be improved effectively. In particular, when the light beams are transmitted to the prism sheets, parts of the light beams are unable to be used effectively due to Fresnel reflection. Thus, how to effectively improve the optical efficiency is certainly an issue for the researchers in this field.

SUMMARY OF THE INVENTION

The invention provides a light guide plate capable of collimating a light beam.

The invention also provides a light source module having a preferable optical efficiency.

A light guide plate of the invention is adapted to be disposed beside a light source. The light guide plate includes a first substrate, a second substrate, a plurality of first microstructures, a plurality of second microstructures, and a plurality of third microstructures. The second substrate is opposite to the first substrate. The first substrate has a light emitting surface, a first bottom surface, and a light incidence surface. The first bottom surface is opposite to the light emitting surface and located between the light emitting surface and the second substrate. The light incidence surface connects the light emitting surface and the first bottom surface. In addition, the light source is disposed beside the light incidence surface. The second substrate has a top surface and a second bottom surface. The top surface is opposite to the second bottom surface and located between the first substrate and the second bottom surface. The first microstructures are disposed on the light emitting surface and respectively extend along a first direction parallel to the light incidence surface. The second microstructures are disposed on the second bottom surface, and respectively extend along the first direction. The third microstructures are connected between the first bottom surface and the top surface, and respectively extend along a second direction perpendicular to the light incidence surface.

According to an embodiment of the invention, each of the first microstructures has a first side surface and a first light guide surface. The first side surface is located between the first light guide surface and the light incidence surface. In addition, an included angle between the first light guide surface and the light emitting surface in the first substrate is greater than 0 degrees and smaller than or equal to 5 degrees. Each of the second microstructures has a second side surface and a second light guide surface. The second side surface is located between the second light guide surface and the light incidence surface, and an included angle between the second light guide surface and the second bottom surface in the second substrate ranges from 25 degrees to 35 degrees.

According to an embodiment of the invention, each of the third microstructures has a first connection surface, a second connection surface, a third connection surface, and a fourth connection surface. The first connection surface is connected to the first bottom surface. The second connection surface is connected to the top surface. The third connection surface and the fourth connection surface are respectively connected between the first connection surface and the second connection surface, and a width of the first connection surface in the first direction is less than a width of the second connection surface in the first direction.

According to an embodiment of the invention, an included angle between the third connection surface and the top surface in the third microstructure ranges from 60 degrees to 70 degrees, and an included angle between the fourth connection surface and the top surface in the third microstructure ranges from 60 degrees to 70 degrees.

According to an embodiment of the invention, the first substrate, the second substrate, the first microstructures, the second microstructures, and the third microstructures are formed of the same material.

According to an embodiment of the invention, the light emitting surface, the first bottom surface, the top surface, and the second bottom surface are parallel to each other.

According to an embodiment of the invention, the light guide plate further includes a reflective layer. The reflective layer is disposed on the second microstructures and on an area of the second bottom surface that is not covered by the second microstructures.

A light source module of the invention includes a light source and the light guide plate.

According to an embodiment of the invention, the light source module further includes a diffuser. In addition, the first microstructures are located between the diffuser and the first substrate.

Based on the above, in the light guide plate according to the embodiments of the invention, the light beam is collimated by configuring the first, second, and third microstructures. Therefore, a prism sheet may be omitted in the light source module using the light guide plate, and the optical efficiency is thus improved effectively.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
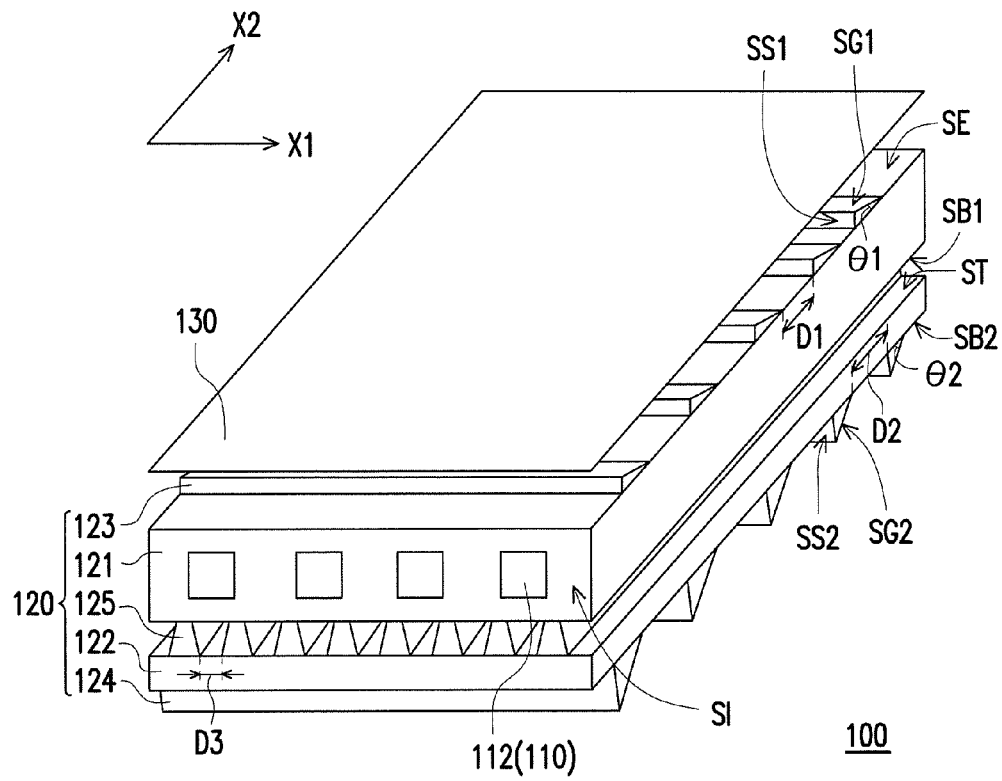
FIG. 1 is a schematic view illustrating a light source module according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
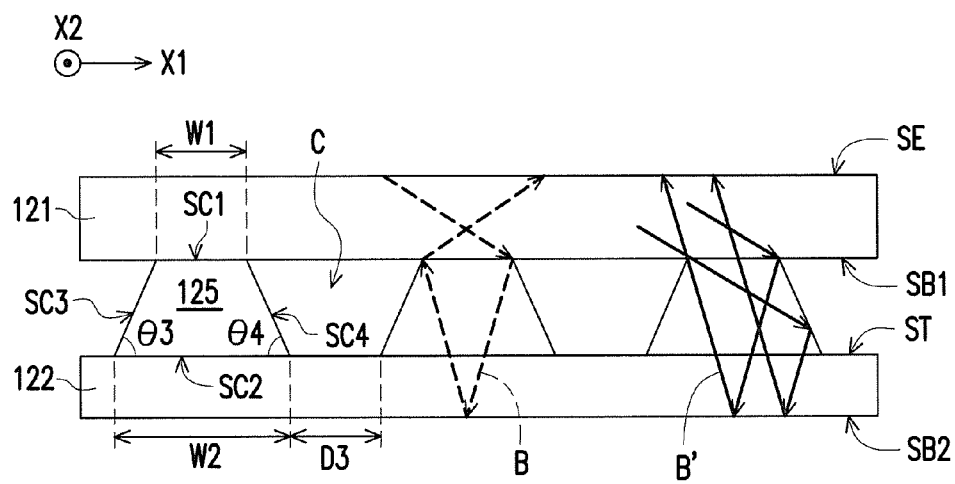
FIG. 2 is a partial enlarged view illustrating a first substrate, a second substrate, and a second microstructure of FIG. 1.

FIG. 1 is a schematic view illustrating a light source module according to an embodiment of the invention. FIG. 2 is a partial enlarged view illustrating a first substrate, a second substrate, and a second microstructure of FIG. 1. Referring to FIG. 1 and FIG. 2, a light source module 100 includes a light source 110 and a light guide plate 120. The light source 110 includes a plurality of light emitting elements 112, for example. In FIG. 1, the number of the light emitting elements 112 that are shown are four. However, the embodiment does not serve to limit the number of the light emitting elements 112. Each of the light emitting elements 112 is a light emitting diode (LED), for example. However, the invention is not limited thereto. In another embodiment, lamps may be used to replace the light emitting elements 112 in the light source 110.

The light guide plate 120 includes a first substrate 121, a second substrate 122, a plurality of first microstructures 123, a plurality of second microstructures 124, and a plurality of third microstructures 125. The numbers of the first microstructures 123, the second microstructures 124, and the third microstructures 125 shown in FIG. 1 are respectively five, five, and eight. However, the embodiment does not serve to limit the numbers of the first, second, and third microstructures 123, 124, and 125.

The first substrate 121 is opposite to the second substrate 122. The first substrate 121 has a light emitting surface SE, a first bottom surface SB1, and a light incidence surface SI. The first bottom surface SB1 is opposite to the light emitting surface SE and located between the light emitting surface SE and the second substrate 122. The light incidence surface SI connects the light emitting surface SE and the first bottom surface SB1. The light source 110 is disposed beside the light incidence surface SI, and the light emitting elements 112 are arranged along a long side of the light incidence surface SI, for example. In another embodiment, when lamps are used to replace the light emitting elements 112 in the light source 110, an extension direction of the lamps is parallel to the long side of the light incidence surface SI.

The second substrate has a top surface ST and a second bottom surface SB2. The top surface ST is opposite to the second bottom surface SB2 and located between the first substrate 121 and the second bottom surface SB2. In this embodiment, the light emitting surface SE, the first bottom surface SB1, the top surface ST, and the second bottom surface SB2 are parallel to each other.

The first microstructures 123 are disposed on the light emitting surface SE, respectively extend along a first direction X1 parallel to the light incidence surface SI, and are arranged along a second direction X2 perpendicular to the light incidence surface SI, for example. In addition, a distance D1 is kept between two adjacent first microstructures 123. The distance D1 in this embodiment decreases as a distance to the light incidence surface SI increases, for example. However, the invention is not limited thereto.

The second microstructures 124 are disposed on the second bottom surface SB2, respectively extend along the first direction X1, and are arranged along the second direction X2, for example. In other words, the second microstructures 124 are disposed to be in parallel with the first microstructures 123. In addition, a distance D2 is kept between two adjacent second microstructures 124. The distance D2 in this embodiment decreases as a distance to the light incidence surface SI increases, for example. However, the invention is not limited thereto.

In this embodiment, shapes of each of the first microstructures 123 and each of the second microstructures 124 are respectively triangular columns, for example, and each of the first microstructures 123 has a first side surface SS1 and a first light guide surface SG1. In addition, the first side surface SS1 is located between the light guide surface SG1 and the light incidence surface SI, and there is an included angle $\theta 1$ between the light guide surface SG1 and the light emitting surface SE in the first substrate 121. Furthermore, each of the second microstructures 124 has a second side surface SS2 and a second light guide surface SG2. In addition, the second side surface SS2 is located between the second light guide surface SG2 and the light incidence surface SI, and there is an included angle $\theta 2$ between the second light guide surface SG2 and the second bottom surface SB2 in the second substrate 122. By modulating the included angles $\theta 1$ and $\theta 2$, an angle at which a light beam is emitted from the light guide plate 120 is controlled. In this embodiment, the included angle $\theta 1$ is greater than 0 degrees and less than or equal to 5 degrees, and the included angle $\theta 2$ is within a range from 25 degrees to 35 degrees, such that the light beam is collimated in the second direction X2, thereby increasing a proportion of light beams that are emitted forward from the light guide plate 120. In a preferred embodiment, the included angle $\theta 1$ is 1 degree, and the included angle $\theta 2$ is 31 degrees.

The third microstructures 125 are connected between the first bottom surface SB1 and the top surface ST, respectively extend along the second direction X2, and are arranged along the first direction X1. In other words, orthogonal projections of the third microstructures 125 on the light emitting surface SE crisscross the first microstructures 123, and orthogonal projections of the third microstructures 125 on the second bottom surfaces SB2 crisscross the second microstructures 124.

In this embodiment, a shape of each of the third microstructures 125 may be a trapezoidal column. As shown in FIG. 2, each of the third microstructures 125 has a first connection surface SC1, a second connection surface SC2, a third connection surface SC3, and a fourth connection surface SC4. The first connection surface SC1 is connected to the first bottom surface SB1. The second connection surface SC2 is connected to the top surface ST. The third connection surface SC3 and the fourth connection surface SC4 are respectively connected between the first connection surface SC1 and the second connection surface SC2.

Based on the principle of étendue, the greater a cross-sectional area is, the smaller a solid angle becomes. Thus, in the embodiment, it is set that a width W1 of the first connection surface SC1 in the first direction X1 is less than a width W2 of the second connection surface SC2 in the first direction X1, making a cross-sectional area of the third microstructure 125 on the first bottom surface SB1 smaller than that of the third microstructure 125 on the top surface ST. Thus, étendue of a light beam entering the third microstructure 125 from the first connection surface SC1 is reduced, and the light beam is consequently collimated in the first direction X1.

However, as shown in dotted lines in FIG. 2, after the light beam enters the third microstructure 125 from the first substrate 121, the effect of collimation may not be achieved if a light beam B reflected from the second bottom surface SB2 of the second substrate 122 is reflected by the third microstructure 125 again. To cope with this issue, an included angle θ3 between the third connection surface SC3 and the top surface ST in the third microstructure 125 and an included angle θ4 between the fourth connection surface SC4 and the top surface ST in the third microstructure 125 are modulated in this embodiment to prevent a light beam B' (as shown in a solid line in FIG. 2) from the second bottom surface SB2 from being reflected by the third microstructure 125 twice, so that the light beam B' from the second bottom surface SB2 is directly emitted from the third microstructure 125, so as to achieve the effect of collimation. For example, the included angle θ3 and the included angle θ4 are respectively within a range from 60 degrees to 70 degrees, and are preferably 66 degrees respectively. The width W1 is 20 μm.

In this embodiment, the first substrate 121, the second substrate 122, the first microstructures 123, the second microstructures 124, and the third microstructures 125 may be formed of the same material, such as polymethylmethacrylate (PMMA), for example. In addition, the first substrate 121 and the first microstructures 123 may be manufactured together, and the second substrate 122, the second microstructures 124, and the third microstructures 125 may be manufactured together. Being manufactured together here may be being manufactured together by injection molding, for example. However, the invention is not limited thereto. In addition, the third microstructures 125 and the first bottom surface SB1 of the first substrate 121 may be adhered together by using an optical adhesive, such as a photocurable adhesive, for example. The optical adhesive that is not shown herein is located at an interface between the first bottom surface SB1 and the first connection surface SC1, for example. In addition, a transmission medium of a light beam in a cavity C surrounded by two adjacent third microstructures 125, the first substrate 121, and the second substrate 122 is air. However, the invention does not serve to limit a manufacturing method of the light guide plate 120. For example, the first substrate 121, the first microstructures 123, and the third microstructures 125 may be manufactured together, and the second substrate 122 and the second microstructures 124 may be manufactured together. In addition, the third microstructures 125 and the top surface ST of the second substrate 122 may be adhered together by using an optical adhesive. Alternatively, the first substrate 121, the second substrate 122, the first microstructures 123, the second microstructures 124, and the third microstructures 125 may be individually manufactured and then adhered together by using an optical adhesive.

In the light guide plate 120 of this embodiment, a reflective layer (not shown) may be further disposed on the second microstructures 124 and an area of the second bottom surface SB2 that is not covered by the second microstructures 124 to reflect a light beam transmitted to the second microstructures 124 or the second bottom surface SB2 and prevent the light beam from being emitted from the bottom surface of the light guide plate 120. A manufacturing method of the reflective layer is, for example, to form a material having a reflective property on the second microstructures 124 and the area of the second bottom surface SB2 that is not covered by the second microstructures 124. For example, silver may be coated on the second microstructures 124 and the area of the second bottom surface SB2 that is not covered by the second microstructures 124, so that the reflective layer is conformal with the second microstructures 124 and the area of the second surface SB2 that is not covered by the second microstructures 124. However, the invention is not limited thereto.

In addition, a diffuser 130 may be further disposed on the light guide plate 120 in the light source module 100 of this embodiment, so that the first microstructures 123 are located between the diffuser 130 and the first substrate 121 to increase an uniformity of light emission of the light source module 100.

Figure 3:
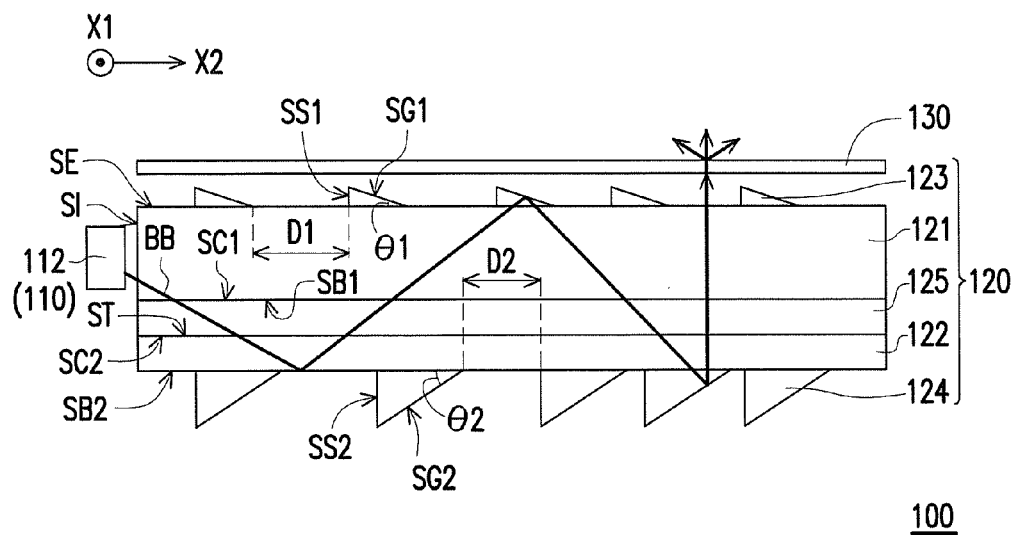
FIG. 3 and FIG. 4 are schematic cross-sectional views of the light source module shown in FIG. 1.
Figure 4:
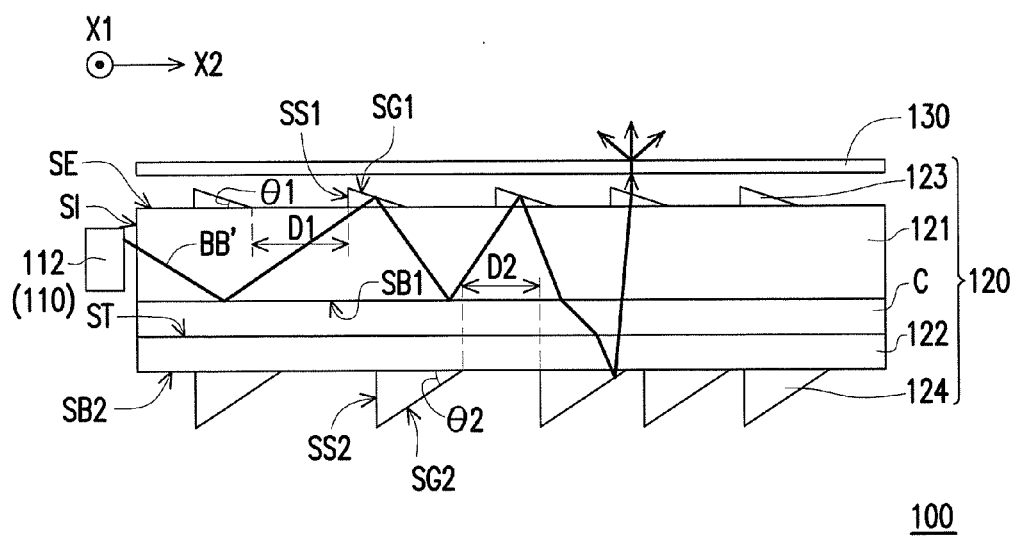

FIG. 3 and FIG. 4 are schematic cross-sectional views of the light source module shown in FIG. 1. The difference between FIG. 3 and FIG. 4 is that FIG. 3 is a cross-sectional view at a position where the third microstructures 125 are located, and FIG. 4 is a cross-sectional view at a position where the cavity C is located. Referring to FIG. 3 and FIG. 4, a light beam emitted from the light source 110 enters the first substrate 121 of the light guide plate 120 from the light incidence surface SI. As shown in FIG. 3, after entering the first substrate 121, a partial light beams BB are emitted to the third microstructure 125, transmitted to the bottom surface (e.g. the second bottom surface SB2 or the second microstructures 124) of the light guide plate 120 through the top surface ST, and reflected by the bottom surface of the light guide plate 120. The light beam BB reflected by the bottom surface of the light guide plate 120 may be directly emitted from the light emitting surface SE, or is transmitted to the bottom surface of the light guide plate 120 again through reflection of the first microstructures 123. The first microstructures 123 are configured to deflect the light beam BB, so that an incident angle of the light beam BB transmitted again to the bottom surface of the light guide plate 120 is reduced. In this way, the light beam BB reflected by the bottom surface of the light guide plate 120 has a chance to be emitted from the light emitting surface SE. In a light path configuration shown in FIG. 3, by modulating a distribution density of the second microstructures 124 (e.g. the distance D2 between two adjacent second microstructures 124), an amount of light beams emitting from each area of the light guide plate 120 may be controlled. Thus, appropriately modulating the distribution density of the second microstructures 124 effectively improves the uniformity of light emission.

Moreover, as shown in FIG. 4, after entering the first substrate 121, a partial light beams BB' may be transmitted to the first bottom surface SB1 that does not contact the third microstructure 125, and most of the light beams BB' may be transmitted back and forth between the first light guide surfaces SG1 of the first microstructures 123 and the first bottom surface SB1 due to total internal reflection. By using the first microstructures 123 to deflect the light beam BB', an incident angle of the light beam BB' transmitted to the first bottom surface SB1 may be reduced, so the light beam BB' has a chance to pass through the cavity C, be transmitted to the bottom surface of the light guide plate 120 (e.g. the second bottom surface SB2 or the second microstructures 124), and then be reflected by the bottom surface of the light guide plate 120 to be emitted from the light emitting surface SE. In a light path configuration shown in FIG. 4, by modulating a distribution density of the first microstructures 123 (e.g. the distance D1 between two adjacent first microstructures 123), an amount of light beams emitting from each area of the light guide plate 120 may be controlled, and loss of the light beam BB' due to back-and-forth reflection in the first substrate 121 may be reduced as well. Thus, appropriately modulating the distribution density of the first microstructures 123 effectively improves the uniformity and optical efficiency.

Proportions of the light beam BB and BB' are determined by a distance D3 (shown in FIG. 2) between two adjacent third microstructures 125. In this embodiment, the third microstructures 125 are kept with a uniform distance, for example, and the distance D3 is equivalent to the width W1, for example. However, the invention is not limited thereto.

In view of the foregoing, in the light guide plate according to the embodiments of the invention, the light beam is collimated by configuring the first, second, and third microstructures. Therefore, a prism sheet may be omitted in the light source module using the light guide plate. Thus, a negative influence on utilization of light due to Fresnel reflection in a conventional configuration where the prism sheet is disposed is solved, and the optical efficiency is thus improved effectively. Moreover, in an embodiment, the uniformity of light emission of the light source module is improved by modulating the distribution density of the first microstructures. In addition, the uniformity and optical efficiency of the light source module are also improved by modulating the distribution density of the second microstructures.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light guide plate, adapted to be disposed beside a light source, the light guide plate comprising:
   a first substrate, having a light emitting surface, a first bottom surface, and a light incidence surface, wherein the first bottom surface is opposite to the light emitting surface, the light incidence surface connects the light emitting surface and the first bottom surface, and the light source is disposed beside the light incidence surface;
   a second substrate, opposite to the first substrate, wherein the first bottom surface is located between the light emitting surface and the second substrate,
   the second substrate has a top surface and a second bottom surface, and the top surface is opposite to the second bottom surface and located between the first substrate and the second bottom surface;
   a plurality of first microstructures, disposed on the light emitting surface and respectively extending along a first direction parallel to the light incidence surface;
   a plurality of second microstructures, disposed on the second bottom surface, and respectively extending along the first direction; and
   a plurality of third microstructures, connected between the first bottom surface and the top surface, and respectively extending along a second direction perpendicular to the light incidence surface.

2. The light guide plate as claimed in claim 1, wherein each of the first microstructures has a first side surface and a first light guide surface, the first side surface is located between the first light guide surface and the light incidence surface, and an included angle between the first light guide surface and the light emitting surface in the first substrate is greater than 0 degrees and smaller than or equal to 5 degrees, and each of the second microstructures has a second side surface and a second light guide surface, the second side surface is located between the second light guide surface and the light incidence surface, and an included angle between the second light guide surface and the second bottom surface in the second substrate ranges from 25 degrees to 35 degrees.

3. The light guide plate as claimed in claim 1, wherein each of the third microstructures has a first connection surface, a second connection surface, a third connection surface, and a fourth connection surface, the first connection surface is connected to the first bottom surface, the second connection surface is connected to the top surface, the third connection surface and the fourth connection surface are respectively connected between the first connection surface and the second connection surface, and a width of the first connection surface in the first direction is less than a width of the second connection surface in the first direction.

4. The light guide plate as claimed in claim 3, wherein an included angle between the third connection surface and the top surface in the third microstructure ranges from 60 degrees to 70 degrees, and an included angle between the fourth connection surface and the top surface in the third microstructure ranges from 60 degrees to 70 degrees.

5. The light guide plate as claimed in claim 1, wherein the first substrate, the second substrate, the first microstructures, the second microstructures, and the third microstructures are formed of the same material.

6. The light guide plate as claimed in claim 1, wherein the light emitting surface, the first bottom surface, the top surface, and the second bottom surface are parallel to each other.

7. The light guide plate as claimed in claim 1, further comprising:
   a reflective layer, disposed on the second microstructures and on an area of the second bottom surface that is not covered by the second microstructures.

8. A light source module, comprising:
   a light source; and
   a light guide plate, comprising:
      a first substrate, having a light emitting surface, a first bottom surface, and a light incidence surface, wherein the first bottom surface is opposite to the light emitting surface, the light incidence surface connects the light emitting surface and the first bottom surface, and the light source is disposed beside the light incidence surface;
      a second substrate, opposite to the first substrate, wherein the first bottom surface is located between the light emitting surface and the second substrate, the second substrate has a top surface and a second bottom surface, and the top surface is opposite to the second bottom surface and located between the first substrate and the second bottom surface;
      a plurality of first microstructures, disposed on the light emitting surface and respectively extending along a first direction parallel to the light incidence surface;
      a plurality of second microstructures, disposed on the second bottom surface, and respectively extending along the first direction; and
      a plurality of third microstructures, connected between the first bottom surface and the top surface, and respectively extending along a second direction perpendicular to the light incidence surface.

9. The light source module as claimed in claim 8, wherein each of the first microstructures has a first side surface and a first light guide surface, the first side surface is located between the first light guide surface and the light incidence surface, and an included angle between the first light guide surface and the light emitting surface in the first substrate is greater than 0 degrees and smaller than or equal to 5 degrees, and each of the second microstructures has a second side surface and a second light guide surface, the second side surface is located between the second light guide surface and the light incidence surface, and an included angle between the second light guide surface and the second bottom surface in the second substrate ranges from 25 degrees to 35 degrees.

10. The light source module as claimed in claim 8, wherein each of the third microstructures has a first connection surface, a second connection surface, a third connection surface, and a fourth connection surface, the first connection surface is connected to the first bottom surface, the second connection surface is connected to the top surface, the third connection surface and the fourth connection surface are respectively connected between the first connection surface and the second connection surface, and a width of the first connection surface in the first direction is less than a width of the second connection surface in the first direction.

11. The light source module as claimed in claim 10, wherein an included angle between the third connection surface and the top surface in the third microstructure ranges from 60 degrees to 70 degrees, and an included angle between the fourth connection surface and the top surface in the third microstructure ranges from 60 degrees to 70 degrees.

12. The light source module as claimed in claim 8, wherein the first substrate, the second substrate, the first microstructures, the second microstructures, and the third microstructures are formed of the same material.

13. The light source module as claimed in claim 8, wherein the light emitting surface, the first bottom surface, the top surface, and the second bottom surface are parallel to each other.

14. The light source module as claimed in claim 8, wherein the light guide plate further comprises a reflective layer, and the reflective layer is disposed on the second microstructures and on an area of the second bottom surface that is not covered by the second microstructures.

15. The light source module as claimed in claim 8, further comprising:
   a diffuser, wherein the first microstructures are located between the diffuser and the first substrate.

* * * * *